United States Patent [19]

Miura

[11] 4,026,375
[45] May 31, 1977

[54] BICYCLE WITH AN INTERNAL COMBUSTION ENGINE
[75] Inventor: Seishi Miura, Wako, Japan
[73] Assignee: Honda Giken Kogyo Kabushiki Kaisha, Tokyo, Japan
[22] Filed: Apr. 9, 1976
[21] Appl. No.: 675,293
[52] U.S. Cl. .................................... 180/33 C
[51] Int. Cl.² ................................. B62K 11/00
[58] Field of Search ............ 180/33 C, 33 R, 65 R, 180/65 A, 33 A, 33 B, 33 D; 123/97 R, 98

[56] References Cited
UNITED STATES PATENTS

| 552,312 | 12/1895 | Battey | 180/33 C |
|---|---|---|---|
| 692,942 | 2/1902 | Strickland | 180/33 C |
| 1,282,068 | 10/1918 | Burton | 123/97 R |
| 2,583,499 | 1/1952 | Teegen | 180/33 C |
| 3,513,928 | 5/1970 | Emmons | 180/65 R |
| 3,773,131 | 11/1973 | Jaulmes | 180/33 C |
| 3,939,932 | 2/1976 | Rosen | 180/33 C |

Primary Examiner—Joseph F. Peters, Jr.
Assistant Examiner—Jack D. Rubenstein

[57] ABSTRACT

A bicycle comprising a vehicle frame having a front wheel, a rear wheel, a pedal crank shaft connected, for manual drive, to the rear wheel, and an internal combustion engine connected, for a mechanical power drive, to the rear wheel. A gear train is interposed between the pedal crank shaft and the rear wheel and comrises an input gear, an output gear and an intermediate gear, the latter being rotatably mounted on a rotatable supporting shaft and interposed between the pedal crank shaft and a driving sprocket connected to the rear wheel such that upon transmission of a torque through the gear train, the supporting shaft is turned in proportion to the torque. There is provided on one side of the supporting shaft a rotary shaft which is arranged to be driven with the intermediate gear so as to be turned in correspondence with the rotation speed of the intermediate gear. A swingable lever is connected at one end to the supporting shaft and at its other end to the rotary shaft, the lever being additionally connected at a middle portion to a throttle control member for the engine.

9 Claims, 3 Drawing Figures

BICYCLE WITH AN INTERNAL COMBUSTION ENGINE

FIELD OF THE INVENTION

This invention relates a bicycle with an internal combustion engine of the type comprising a vehicle frame with a front wheel, a rear wheel, and a pedal crank shaft connected to the rear wheel and an internal combustion engine such as a gasoline engine or the like connected to the rear wheel.

BACKGROUND OF THE INVENTION

The Applicant has previously proposed an arrangement, in this type of bicycle, such that throttle control of the engine is effected depending on rotation of the pedal crank shaft. However, it is preferably that such throttle control be effected depending both on transmission torque and rotation speed of the crank shaft.

SUMMARY OF THE INVENTION

An object of this invention is to provide a bicycle with an internal combustion engine which satisfies the above requirement. Namely, the engine throttle control is made dependent on transmission torque and rotation speed of the crank shaft.

According to this invention, in a bicycle of the type in which a vehicle frame having a front wheel, a rear wheel and a pedal crank shaft connected, for manual driving, to the rear wheel is provided with an internal combustion engine connected, for mechanical power drive, to the rear wheel, an improvement is provided by a gear train comprising an input gear, an output gear and an intermediate gear, rotatably mounted around a rotatable supporting shaft, interposed between the pedal crank shaft and a driving sprocket connected to the rear wheel such that on transmission of a torque through the gear train the supporting shaft is turned in proportion to the torque, and there is provided on one side of the shaft a rotary shaft which is arranged to be driven with the intermediate shaft in correspondence with the rotation speed of the gear, and a swingable lever which is connected at one end to the supporting shaft and at its other end to the rotary shaft is connected at a selected middle point to a throttle control member for the engine.

One embodying example of this invention will now be explained with reference to the accompanying drawing.

DETAILED DESCRIPTION

Figure 1:
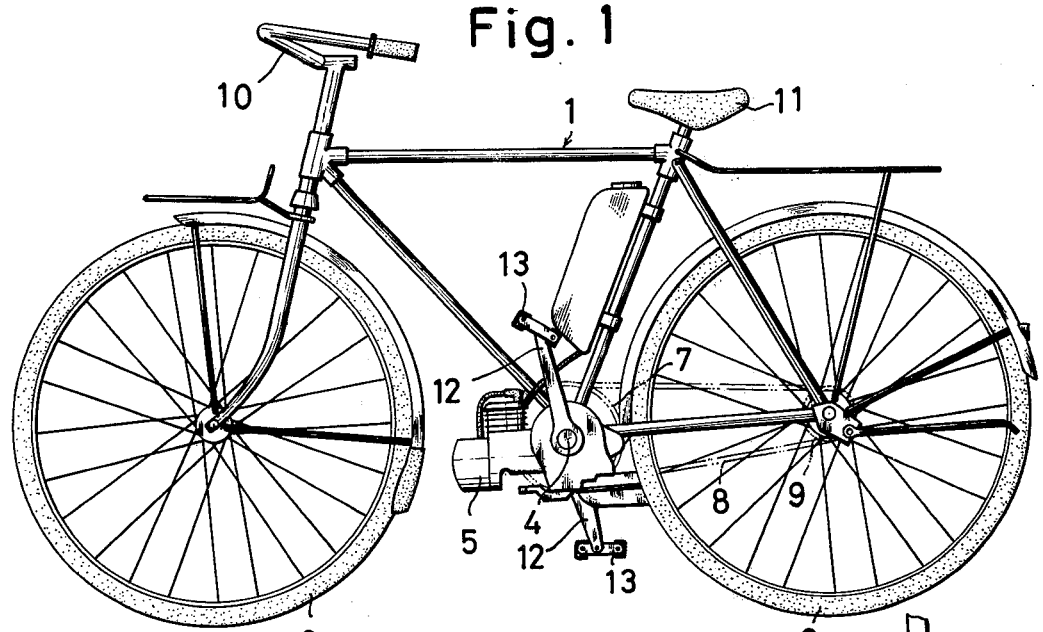
FIG. 1 is an elevational side view of one embodiment of a bicycle according to the invention.

Referring to the drawing, numeral 1 denotes a vehicle frame and the frame 1 is provided with a front wheel 2, a rear wheel 3 and a pedal crank shaft 4 connected to the rear wheel 3 so as to form a bicycle. Additionally, the bicycle is provided with an internal combustion engine 5 such as a gasoline engine or the like drivingly connected to the rear wheel 3 by any conventional transmission such as, for example, a frictional wheel driven by the engine and in frictional driving contact with the periphery of the rear wheel. The pedal crank shaft 4 is inserted through a hanger 6 at the lower portion of the frame 1 and the crank shaft is provided at one end portion with a driving sprocket 7 connected via chain 8 to a sprocket 9 on the axle of the rear wheel 3. Numeral 10 denotes a steering bar at the front top portion of the vehicle body 1 and numeral 11 denotes the driver's seat at the rear, top portion of the frame. The pedal crank shaft 4 is provided at both ends with crank arms 12 having pedals 13, mounted thereon. The above construction is not different from a conventional bicycle.

Figure 2:
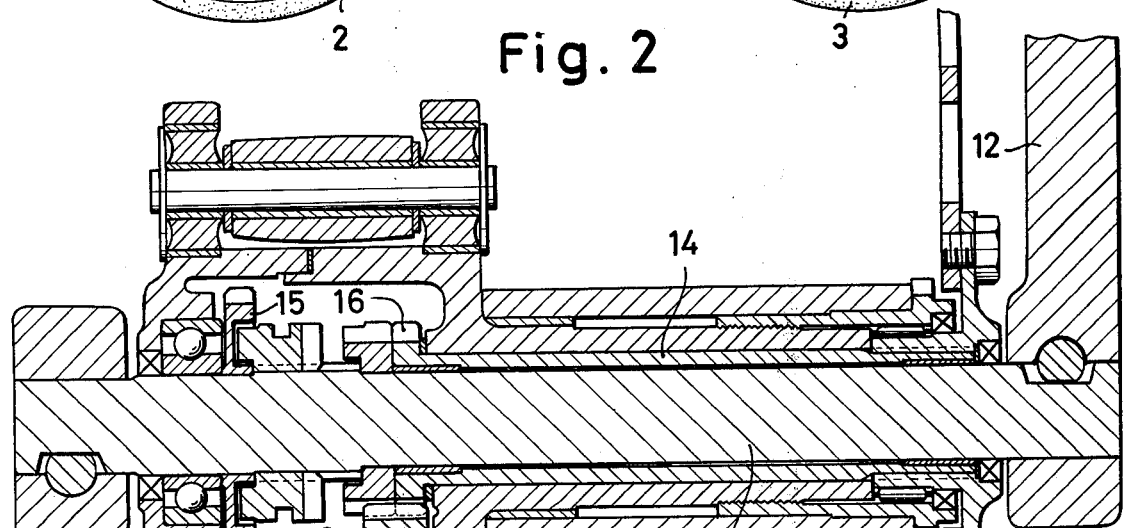
FIG. 2 is a sectional top plan view, on enlarged scale, of a major portion thereof.
Figure 3:
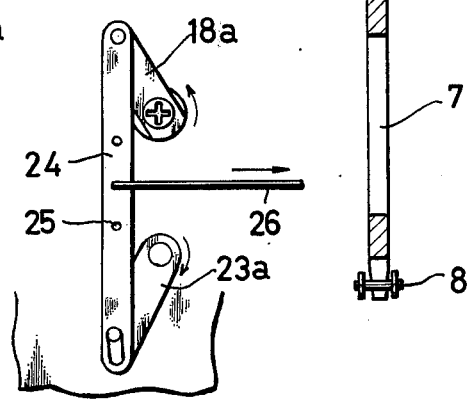
FIG. 3 is an elevational side view of the portion in FIG. 2.

As shown in FIG. 2, the pedal crank shaft 4 is provided around its periphery with a rotatable tubular shaft 14 and the sprocket 7 is secured to one end of the tubular shaft 14. The crank shaft 4 and the tubular shaft 14 are interconnected through a gear train comprising an input gear 15, an output gear 16 and an intermediate gear 17 in mesh with the two gears 15 and 16. In greater detail, the input gear 15 and the output gear 16 are mounted respectively on the crank shaft 4 and the tubular shaft 14, so as to be rotatable therewith and the intermediate gear 17 is rotatably mounted on a rotatable supporting shaft 18 offset from shaft 4, so that rotation of the pedal crank shaft 4 can be transmitted through the gear train to the tubular shaft 14 and accordingly further to the rear wheel 3 through the driving sprocket 7, but only when a load exists on the rear wheel 3 and a pre-determined torque is to be transmitted thereto. Namely, when the pedal crank shaft 4 is driven for transmitting a torque thereto, the input gear 15 is thereby driven to apply a radially directed pushing force on the intermediate gear 17, so that the intermediate gear 17 is pushed thereby to be brought into pressure contact with the supporting shaft 18, and consequently the supporting shaft 18 can be given a corresponding turning movement. In other words, when the pedal crank shaft 4 is driven for transmitting a given torque to the rear wheel 3, the supporting shaft 18 is turned in the direction corresponding to the torque. The supporting shaft 18 can thus be operated as a torque detecting device. Numeral 19 denotes a return spring mounted at one end of the supporting shaft 18.

On one side of the supporting shaft 18 is an assembly comprising a casing 20, which is filled with a viscous fluid, such as silicon oil or the like, and a rotatable rotor 21 is supported within the casing. The casing 20 and the intermediate gear 17 are in engagement with one another through a gear 22, so that by rotation of the gear 17 following the rotation of the crank shaft 4, the casing 20 is rotated and accordingly the rotor 21 can be rotated in one direction by the casing 20 through the viscous fluid within the casing 20. In other words, the rotor 21 is so moved upon rotation of the crank shaft 4 as to be turned in correspondence with the rotation speed of the crank shaft 4, and consequently it can serve as a rotation speed detecting device. Numeral 23 denotes a rotary shaft moving with the rotor 21.

The supporting shaft 18, that is, the shaft serving as the torque detecting device and the shaft 23 for the rotor 21, that is, the rotary shaft serving as the rotation speed detecting device are provided at respective end portions with radially extending arm members 18a, 23a projecting therefrom, and a link-shaped swingable lever 24 connects the free end portions thereof. The lever 24 is connected at one of a plurality of longitudinally spaced holes 25 through a linkage member 26, such as a rod or the like, to a throttle control member (not shown) of the engine 5. Thus, when the supporting shaft 18 serving as the torque detecting device is turned in one direction according to the detected torque, one end of the swingable lever 24 is pushed thereby to incline in one direction, concurrently, when the rotating shaft 23 serving as the rotation speed detecting device is turned in the other direction in proportion to the detected rotation speed, the other end of the lever 24 is pushed thereby to incline in the other direction. These inclined or swinging movements act on the throttle control member of the engine 5 through the linkage member 26, and thus, an opening and closng control corresponding thereto can be imparted to the throttle member.

Thus, according to this invention, the transmission torque of the pedal crank shaft and the rotation speed of the said shaft are respectively detected and throttle control of the engine is effected by the two, so that output power control of the engine can be accommodated to the running condition of the vehicle. Additionally, according to this invention, the arrangement is such that the detected values are supplied to opposite ends of the swingable lever and a resultant component is obtained at the middle point of the lever, so that by suitably varying said middle point, the ratio of the two in the resultant component can be freely selected, and any desired characteristic can be obtained.

What is claimed is:

1. In a bicycle with an internal combustion engine having a frame, a front wheel, a rear wheel, a pedal crank shaft connected to the rear wheel for manual drive thereof, the engine being connected to the rear wheel for power drive thereof, an improvement comprising first means for producing an output related to drive speed imparted to the rear wheel by the pedal crank shaft, second means for producing an output related to drive torque imparted to the rear wheel by the pedal crank shaft, and third means responsive to the outputs of said first and second means for controlling a throttle member of the engine.

2. The improvement as claimed in claim 1 comprising a gear train between said pedal crank shaft and said rear wheel, said first and second means being coupled to said gear train.

3. The improvement as claimed in claim 2 wherein said gear train comprises an input gear coupled to said pedal crank shaft, an output gear coupled to said rear wheel, and an intermediate gear coupling said input and output gears, said second means comprising a rotatable support shaft for said intermediate gear which turns in proportion to the torque applied through the intermediate gear, said first means comprising a rotary shaft coupled for rotation with the intermediate gear to be turned in correspondence with the rotation thereof.

4. The improvement as claimed in claim 3 wherein said third means comprises a pivotable lever coupled to said rotary shaft and to said rotatable support shaft for controlling said throttle member of the engine.

5. The improvement as claimed in claim 4 wherein said lever has opposite ends, one connected to the rotary shaft, the other to said rotatable support shaft, said lever having an intermediate portion coupled with a throttle control member for control of said throttle member of the engine.

6. An improvement as claimed in claim 5 wherein said lever has a plurality of holes arranged in said intermediate position for selective connection with said throttle control member for said engine.

7. An improvement as claimed in claim 6 wherein said rotary shaft and rotatable support shaft are parallel to one another.

8. An improvement as claimed in claim 7 comprising a casing on said rotary shaft coupled in rotation with said intermediate gear.

9. An improvement as claimed in claim 8 comprising a drive gear secured on said rotary shaft within said casing, said casing containing a viscous damping fluid for rotatably coupling said casing and drive gear.

* * * * *